US012297073B2

(12) United States Patent
Finschi

(10) Patent No.: US 12,297,073 B2
(45) Date of Patent: May 13, 2025

(54) ROUTE PLANNING ON THE BASIS OF EXPECTED PASSENGER NUMBER

(71) Applicant: INVENTIO AG, Hergiswil (CH)

(72) Inventor: Lukas Finschi, Ebikon (CH)

(73) Assignee: Inventio AG, Hergiswil (CH)

( * ) Notice: Subject to any disclaimer, the term of this patent is extended or adjusted under 35 U.S.C. 154(b) by 1365 days.

(21) Appl. No.: 16/955,327

(22) PCT Filed: Dec. 13, 2018

(86) PCT No.: PCT/EP2018/084784
§ 371 (c)(1),
(2) Date: Jun. 18, 2020

(87) PCT Pub. No.: WO2019/121329
PCT Pub. Date: Jun. 27, 2019

(65) Prior Publication Data

US 2021/0047144 A1 Feb. 18, 2021

(30) Foreign Application Priority Data

Dec. 21, 2017 (EP) .................................... 17209784

(51) Int. Cl.
*B66B 1/24* (2006.01)
*B66B 1/34* (2006.01)
(Continued)

(52) U.S. Cl.
CPC .......... *B66B 1/2416* (2013.01); *B66B 1/3461* (2013.01); *B66B 1/468* (2013.01);
(Continued)

(58) Field of Classification Search
CPC ..... B66B 1/2416; B66B 1/3461; B66B 1/468; B66B 5/0012; B66B 1/2408;
(Continued)

(56) References Cited

U.S. PATENT DOCUMENTS 7,694,781 B2 * 4/2010 Sorsa .................... B66B 1/2458 187/382
2010/0326773 A1 * 12/2010 Mitsuda ................ B66B 1/2458 187/387
(Continued)

FOREIGN PATENT DOCUMENTS

WO WO-2005070804 A2 * 8/2005 ............. B66B 1/462

*Primary Examiner* — Jeffrey Donels
(74) *Attorney, Agent, or Firm* — Wiggin and Dana LLP

(57) ABSTRACT

In an elevator System with a destination call control device, a first destination call being input on a floor by a first passenger at a first point in time is evaluated in order to determine first call information comprising data on a call input floor and/or a destination floor. The first call information determines if a number of additional passengers are to be assigned to the first destination call resulting in an additional space requirement in an elevator car handling the first destination call. Information on the additional space requirement is generated if a number of additional passengers are to be assigned to the first destination call. If this is the case, the first destination call is allocated with the aid of an allocation algorithm by using information on the additional space requirement in order to transport the first passenger from the call input floor to the destination floor.

18 Claims, 2 Drawing Sheets

(51) Int. Cl.
*B66B 1/46* (2006.01)
*B66B 5/00* (2006.01)

(52) U.S. Cl.
CPC .......... *B66B 5/0012* (2013.01); *B66B 1/2408* (2013.01); *B66B 2201/103* (2013.01); *B66B 2201/222* (2013.01); *B66B 2201/23* (2013.01); *B66B 2201/4615* (2013.01); *B66B 2201/463* (2013.01)

(58) Field of Classification Search
CPC ........ B66B 2201/103; B66B 2201/222; B66B 2201/23; B66B 2201/4615; B66B 2201/463; B66B 1/2458
See application file for complete search history.

(56) References Cited

U.S. PATENT DOCUMENTS

| | | | | |
|---|---|---|---|---|
| 2018/0111787 | A1* | 4/2018 | Patel | B66B 1/2458 |
| 2019/0106289 | A1* | 4/2019 | Kuusinen | B66B 1/3407 |

* cited by examiner

ROUTE PLANNING ON THE BASIS OF EXPECTED PASSENGER NUMBER

CROSS-REFERENCE TO RELATED APPLICATIONS

This application is the national phase application under 35 U.S.C. § 371 claiming the benefit of priority based on International Patent Application No. PCT/EP2018/084784, filed on Dec. 13, 2018, which claims the benefit of priority based on European Patent Application No. 17209784.2, filed on Dec. 21, 2017. The contents of each of these applications are herein incorporated by reference.

FIELD OF THE INVENTION

The technology described herein generally pertains to an elevator system with a destination call control, particularly its configuration for call allocation and route planning. Exemplary embodiments of the technology also pertain to a method for operating such an elevator system.

BACKGROUND OF THE INVENTION

In order to enable a passenger to call an elevator, known elevator systems either have a floor terminal for inputting the desired transport direction (e.g. "up" and "down" buttons) or a floor terminal for inputting the desired destination floor. The latter makes it possible to realize elevator systems with a destination call control, which allocates an elevator car to an elevator call of a passenger in order to transport the passenger to a desired destination floor. An exemplary embodiment of an elevator system with a destination call control is disclosed in document EP 0 443 188 B1; the destination call control allocates elevator calls based on calculated operating costs and variable bonus/malus factors.

Such allocation methods are based on the assumption that each passenger inputs an elevator call. However, such disciplined behavior is not always encountered in realistic situations as explained in EP 1 522 518 B1; in a group of persons with the same destination floor, it can occur that one person calls the elevator and all persons board the allocated elevator car. Subsequently, only relatively little space may remain in the elevator car depending on the size of the group, wherein the remaining space may under certain circumstances be so small that a passenger on another floor, who was already scheduled to be transported with this elevator car, can no longer board the elevator car (or wants to board the elevator car because it is excessively crowded). In such instances, it is known, e.g. from EP 1 552 518 B1 or US 2016/0297642 A1, to omit the scheduled stop on the floor and to travel past the floor; this is referred to as bypass in these publications. According to EP 1 552 518 B1 and US 2016/0297642 A1, the criterion for the activation of the bypass function is the measured load in the elevator car. However, the bypass function cannot be activated if the floor is the destination of a passenger in the elevator car.

Although the aforementioned solutions with bypass function potentially prevent an already full elevator car from stopping on a floor, on which no additional passengers can board the elevator car, they may lead to a significantly increased waiting time for the waiting passengers. In a destination call control, the aforementioned elevator car has to return to this floor because it was allocated to the passengers; it is not possible to simply select another elevator car that potentially could pick up the passengers earlier. The bypass function therefore may lead to a significant delay that can frustrate the passengers; the waiting passengers consequently may input new elevator calls, possibly also to destinations that do not correspond to their actual destination, just to be able to finally board an elevator car. This may result in additional disadvantages for other passengers. Consequently, there is a demand for a technology that handles the elevator calls in an improved manner and enhances the efficiency of the elevator system.

SUMMARY OF THE INVENTION

One aspect of such an improved technology concerns a method for operating an elevator system in a building, wherein the elevator system comprises a destination call control device and an elevator car, which can travel between floors of the building and has a defined passenger capacity. A first destination call being input on a floor by a first passenger at a first point in time is evaluated in order to determine first call information from the first destination call. The first call information contains data on a call input floor and/or a destination floor. The first call information is used for determining if a number of additional passengers are to be assigned to the first destination call, wherein the number of additional passengers results in an additional space requirement in an elevator car handling the first destination call. Information on the additional space requirement is generated if a number of additional passengers are to be assigned to the first destination call. If a number of additional passengers are to be assigned to the first destination call, the first destination call is allocated with the aid of an allocation algorithm by using information on the additional space requirement in order to transport the first passenger from the call input floor to the destination floor.

Another aspect concerns an elevator system in a building. The elevator system comprises an elevator car that can travel between floors of the building and has a defined passenger capacity. A destination call control device is configured for evaluating a first destination call being input on a floor by a first passenger at a first point in time in order to determine first call information from the first destination call, wherein the first call information contains data on a call input floor and/or a destination floor. The destination call control device is also configured for determining if a number of additional passengers are to be assigned to the first destination call based on the first call information, wherein the number of additional passengers results in an additional space requirement in an elevator car handling the first destination call. The destination call control device is furthermore configured for generating information on the additional space requirement if a number of additional passengers are to be assigned to the first destination call and, if a number of additional passengers are to be assigned to the first destination call, for allocating the first destination call with the aid of an allocation algorithm by using information on the additional space requirement in order to transport the first passenger from the call input floor to the destination floor.

The exemplary embodiments of the technology described herein take into account the above-described situations, in which additional unscheduled passengers with the same destination board an elevator car after a destination call of a passenger. According to the technology, the destination call control makes during the call allocation an assumption about a number of additional passengers, who would like to be transported together with a calling passenger without having input a destination call themselves and have a corresponding space requirement in the elevator car. The technology deviates from the conventional approach, in which a space requirement for a passenger has to be included for each destination call, based on data on the passenger behavior on the floors that is stored in a database. This makes it possible to make more realistic assumptions about the actual space requirement such that the elevator system can be operated with improved efficiency and the waiting times for the passengers can in turn also be optimized.

The data stored in the database may be organized in different ways. In an exemplary embodiment, the database is stored in a storage device, wherein a plurality of datasets are stored in the database. Each dataset has predefined data fields, wherein a first data field indicates the call input floor, a second data field indicates a time window, a third data field indicates the destination floor and a fourth a data field indicates the number of additional passengers for the call situation described in the dataset.

The technology described herein determines if a number of additional passengers are to be assigned to the first destination call with the aid of such a database. According to an exemplary embodiment, this is achieved by resorting to the database and determining if the first destination call corresponds to a call situation stored in the database. If this is the case, the number of additional passengers for this call situation defined by the first destination call is obtained. The generation of information on the additional space requirement therefore comprises reading the fourth data field in order to determine the number of additional passengers.

The data stored in the database can be determined in different ways. In an exemplary embodiment, the elevator system comprises a sensor system that is linked to the destination call control device and the storage device. The sensor system determines information on a number of passengers, who board the elevator car on a floor. The sensor system can be used, for example, for determining the number of additional passengers indicated in the fourth data field. In an exemplary embodiment, the sensor system comprises sensors that are arranged on the floors and linked to the destination call control device and the storage device via a line. A sensor of the sensor system comprises in an exemplary embodiment a camera and the sensor system is configured for determining the number of passengers from images recorded by the camera. As an alternative to such a self-learning system, persons may also observe and record the behavior of the passengers in dependence on the time of day and the day of the week in order to thereby obtain data for the database.

In an exemplary embodiment, the destination call control device is also configured for adapting the generated information on the additional space requirement by means of the information on the number of boarding passengers determined by the sensor system, as well as for using the adapted information on the additional space requirement for handling passengers. In this way, the scheduling of the handling sequence of passengers can be improved, e.g., because the (assumed) additional space requirement can be increased or decreased based on the number of actually boarding passengers.

In an exemplary embodiment, the space requirement of the first passenger is increased by the space requirement of the additional passengers for the allocation of the first destination call. The resulting overall space requirement is fed to the allocation algorithm. In this context, it is advantageous that the allocation algorithm does not have to be expanded or otherwise altered in comparison with known methods because the modification of the space requirement takes place independently of the allocation algorithm.

In an exemplary embodiment, the information on the additional space requirement is kept separate from the first destination call for the allocation of the first destination call; both are separately fed to the allocation algorithm. In this context, it is advantageous that the allocation algorithm can be respectively supplemented or altered with simpler or more complex rules in order to take into account the additional space requirement in different planning steps. Typical planning steps are the calculation of the space requirement for passengers waiting on a floor or the calculation of the space requirement for passengers, who would like to be jointly and simultaneously transported in the elevator car. In both instances, the individual normal space requirement and the individual additional space requirement can be taken into account for each of the respective passengers.

If a number of destination calls essentially are input by different passengers at the first point in time, for example, the allocation of the destination calls is based on a space requirement that, for one passenger per destination call, results from the number of destination calls and a maximum number of additional passengers. The maximum number of additional passengers can thereby be determined. For example, if three destination calls are input and one additional passenger is respectively assigned to two of these destination calls and three additional passengers are assigned to one of these destination calls, the maximum number of additional passengers is equal to three. This has the advantage that more space requirement is included if too few calls are input, but no unnecessary additional space requirement is any longer included at a sufficient number of calls.

In another example, in which a number of destination calls essentially are input by different passengers at the first point in time, the allocation of the destination calls is based on a space requirement that, for one passenger per destination call, results from the number of destination calls and a maximum number of additional passengers per floor. In this case, a number of additional passengers is determined for each destination call and each floor in order to thereby determine a maximum value of the additional space requirement per floor; the resulting maximum values are added. This has the advantage that no unnecessary additional space requirement is included if multiple calls are input by passengers with the same destination, but the calculation for passengers with different destinations is respectively based on additionally traveling passengers in order to thereby include sufficient space.

BRIEF DESCRIPTION OF THE DRAWINGS

Different aspects of the enhanced technology are described in greater detail below with reference to exemplary embodiments in connection with the figures. Identical elements are identified by the same reference symbols in the figures. In these figures.

DETAILED DESCRIPTION OF EMBODIMENTS OF THE INVENTION

Figure 1:
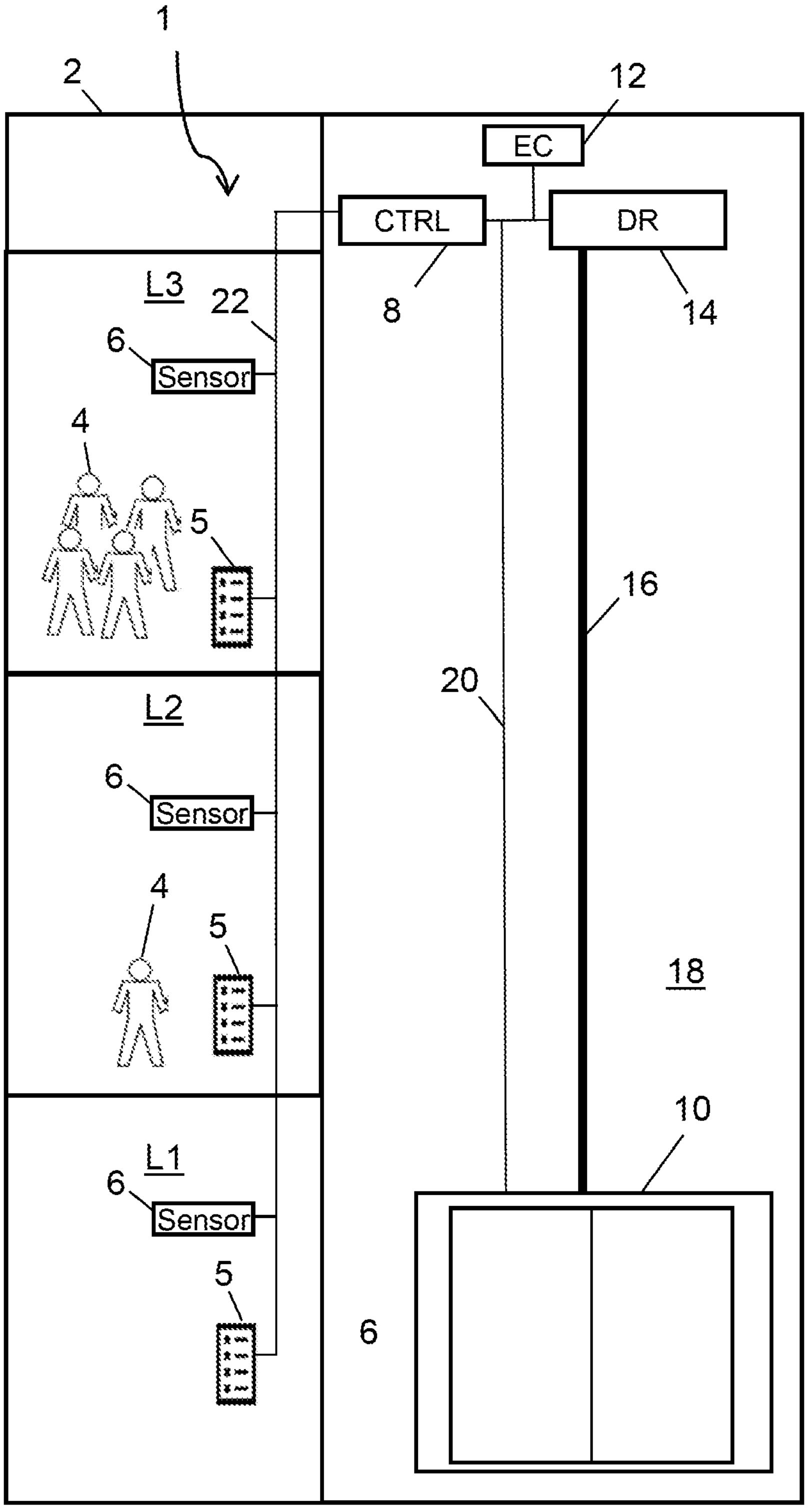
FIG. 1 shows a schematic representation of an exemplary embodiment of an elevator system in a building.

FIG. 1 shows a schematic representation of an exemplary embodiment of an elevator system 1 in a building 2; the building 2 basically may be any type of building with multiple floors (e.g. residential building, hotel, office building, sports stadium, etc.) or a ship. Components and functions of the elevator system 1 are described below as far as they appear helpful in understanding the technology described herein. The building 2 illustrated in FIG. 1 has multiple floors L1, L2, L3 that are served by the elevator system 1, i.e. a passenger 4 can be transported from a boarding floor to a destination floor by the elevator system 1. The boarding floor is also referred to as call input floor herein.

In the exemplary embodiment shown, the elevator system 1 has an elevator car 10 that can be displaced in an elevator shaft 18, wherein said elevator car is connected to a drive unit (DR) 14 with the aid of supporting means 16 (cables or belts) and suspended on this drive unit 14. The elevator may be a traction elevator, wherein additional details such as a counterweight and guide rails are not illustrated in FIG. 1. The elevator control (EC) 12 is connected to the drive unit 14 and controls the drive unit 14 so as to displace the elevator car 10 in the shaft 18. A person skilled in the art generally is familiar with the function of a traction elevator, its components and the functions of an elevator control 12. In another exemplary embodiment, the elevator system 1 may comprise a hydraulic elevator. A person skilled in the art is also aware of the fact that the elevator system 1 may comprise multiple elevator cars or one or more groups of elevators.

The elevator system 1 illustrated in FIG. 1 is equipped with a destination call control device, the function of which is implemented in the control device (CTRL) 8 in the exemplary embodiment shown. The control device 8 is also respectively referred to as destination call control 8 or destination call control device 8 below.

In an exemplary embodiment, the control device 8 may be entirely or partially implemented in the elevator control 12. If the elevator system 1 comprises one or more groups of elevators, the destination call control 8 or its function may be respectively implemented in an elevator group control. The destination call control 8 allocates one of potentially multiple elevator cars 10 to a destination call of a passenger 4, which is input on a floor terminal 5, and communicates the corresponding allocation information to the elevator control 12 via a communication bus 24.

The basic function of a destination call control and the call allocation carried out thereby are known, for example, from the book by G. C. Barney et al., Elevator Traffic Analysis Design and Control, Rev. 2nd Ed, 1985, pp. 135-147, or above-cited patent document EP 0 443 188 B 1. According to this patent document, for example, a computer knows the load, the position and the operating status of an elevator car and the operating status of a drive for each elevator of the elevator system at any point in time and has additional data on the previous traffic volume and currently applicable bonus/malus factors. Based on this information, the described destination call allocation algorithm allocates newly input destination calls as optimally as possible in accordance with predefined criteria. These criteria essentially concern functional requirements for the call handling. The destination call allocation is based on calculations of the operating costs. The individually calculated operating costs are compared with one another call-by-call and the elevator with the lowest operating costs is selected for handling the destination call. Additional details on the structure of the elevator system 1 are provided at a different point of this description.

Figure 2:
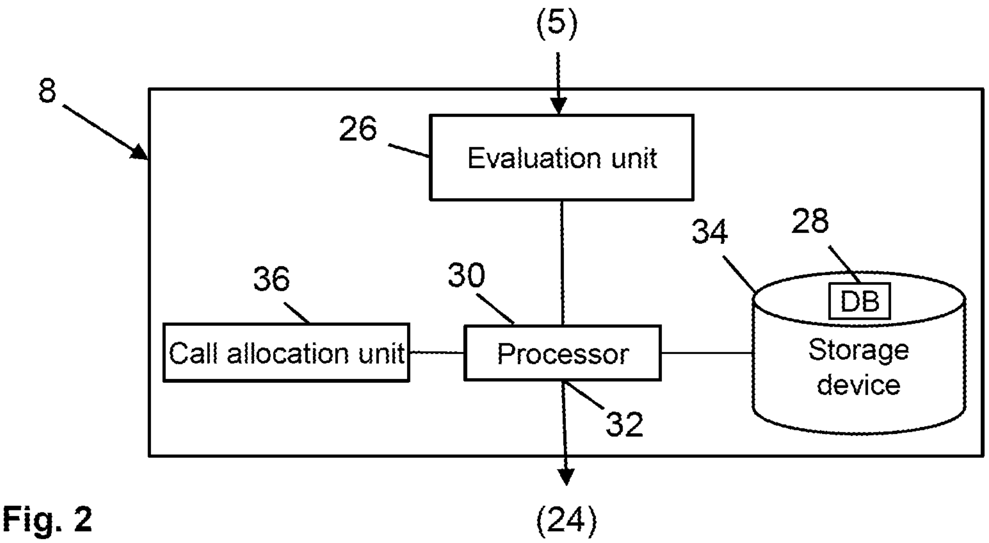
FIG. 2 shows an exemplary representation of an exemplary embodiment of a destination call control device.

FIG. 2 shows an exemplary representation of an exemplary embodiment of a destination call control device 8. In this illustration, the destination call control device 8 comprises multiple functional units such as a destination call evaluation unit 26 that is connected to the floor terminals 5, a call allocation unit 36, a storage device 34 with a database 28 and a processor 30 that controls the destination call control device 8. The processor 30 has an output 32 that is connected to the communication bus 24. A person skilled in the art is aware of the fact that the functional units shown may in another embodiment also be combined into one unit.

In the situation illustrated in FIG. 1, the technology described herein can be advantageously applied for operating the elevator system 1 as efficiently as possible and as conveniently as possible for the passengers 4 (particularly with respect to the waiting time). According to a brief and exemplary summary, the operation of the elevator system 1 according to an exemplary embodiment takes place as follows: when a passenger 4 ("calling passenger 4") calls an elevator car 10 on a floor L1, L2, L3 by inputting a destination call, the destination call control 8 makes an assumption about a number of passengers 4, who would like to be transported together with the calling passenger 4 and have a corresponding space requirement in the elevator car 10. This assumption is based on stored data that indicates the number of passengers 4 to be usually expected in addition to the calling passenger 4 at the time of the call input for each floor L1, L2, L3. The data may be obtained from observations of the behavior of the passengers 4 (empirical values) or with the aid of a self-learning system and stored, e.g., for each floor L1, L2, L3 in dependence on the time of day and the day of the week. The destination call control 8 makes such an assumption for each additional destination call that is input on another floor L1, L2, L3 and can potentially be handled together with the previously input destination call. Since each elevator car 10 can only accommodate a limited number of passengers 4, the destination call control utilizes the assumptions it has made for the call allocation and route planning. For example, the assumptions may lead to the exclusion of an elevator car 10, which is advantageous with respect to the operating costs although it would potentially still have space for a few more passengers, but instead from the beginning to the allocation of an elevator car 10, which in fact is disadvantageous with respect to the costs, but has more space for the expected passengers 4.

As mentioned above, the destination call control utilizes assumptions that in a first embodiment are based on stored data. This data is stored in the database 28 of the storage device 34 illustrated in FIG. 2. The database 28 stores a plurality of datasets, wherein each dataset has predefined data fields that describe a call situation. Four data fields are illustrated in the example according to FIG. 2, but the number of data fields may also be greater or smaller in other exemplary embodiments. A first data field indicates the call input floor, a second data field indicates a time window, a third data field indicates the destination floor and a fourth data field indicates the number of additional passengers (4) for the call situation described in the dataset. The data contained in the database 28 may be organized in accordance with the exemplary structure illustrated in the following table (table 1). The table may be referred to as allocation table ("look-up table"). The data in the table and its organizational structure should merely be interpreted as examples.

TABLE 1

| | Floor (1) | Time window (2) | Destination floor (3) | Number of additional passengers (4) |
|---|---|---|---|---|
| 1 | L1 | 7:00-7:30 | L3 | 5 |
| 2 | L1 | 7:30-8:30 | L2 | 2 |
| 3 | L2 | 7:00-7:30 | L3 | 4 |
| 4 | L3 | 11:30-12:30 | L1 | 7 |

A few of the exemplary call situations illustrated in table 1 are described below. According to one of the call situations (line 1 in table 1), a passenger 4 inputs a (first) destination call to the floor L3 on the floor L1 between 7:00 and 7:30. According to table 1, the destination call control makes the assumption that not only the calling passenger 4 would like to be transported to the floor L3 (basic assumption), but rather also five additional passengers 4. Consequently, a total of six passengers 4 correspond to this destination call. Such a situation may arise, e.g., if these passengers 4 should be present at their workstations between 7:00 and 7:30.

If no additional destination call is input approximately at the time of the (first) destination call in the time window between 7:00 and 7:30, the destination call control can allocate an elevator car 10, which carries out the transport from the floor L1 to the floor L3, to the destination call conventionally (e.g. based on a cost analysis). However, if another (second) destination call is input, e.g. on the floor L1 to the floor L2, and the table 1 contains no data on the number of additional passengers (i.e. the number of additional passengers is zero), the destination call control can carry out the call allocation based on the basic assumption (one passenger per destination call). If the elevator car 10 in this example has a capacity of eight persons or passengers, the destination call control 8 can allocate the destination call of this passenger 4 to the elevator car 10, which was allocated to the transport of the six passengers 4 (first destination call) to the floor L3. Seven passengers 4 therefore board the elevator car 10 on the floor L1.

However, the allocation takes place differently if a third destination call to the floor L3 (line 3 in table 1) is input on the floor L2 approximately at the time of the first destination call. According to table 1, the destination call control makes the assumption that the calling passenger 4 and four additional passengers 4 would like to be transported. The elevator car 10 allocated to the first destination call (six passengers 4) has a capacity of eight persons and therefore can no longer accommodate the five passengers 4 waiting on the floor L2 (third destination call). With respect to the call allocation, this means that the destination call control 8 does not allocate the third destination call to the elevator car 10 scheduled for the transport from the floor L1 to the floor L3 because there is insufficient space for the scheduled additional passengers in the elevator car. Instead, the destination call control 8 can allocate another elevator car 10 to the third destination call. This makes it possible to prevent that the elevator car has insufficient space for allowing the expected additional passengers waiting on the floor L2 to board during the stop on this floor. In addition, this may potentially also lead to a minimized waiting time for the passengers 4 waiting on the floor L2. If no passengers are transported, e.g. from the floor L1 to the floor L2, the destination call control 8 may alternatively allocate the first and the third destination call to the same elevator car 10 and plan the routes in such a way that the elevator car 10 initially travels from the floor L1 to the floor L3 in order to handle the first destination call and subsequently from the floor L3 to the floor L2 in order to handle the third destination call. Although the sequence of the floors being served may in this case be identical to systems with the above-described bypass function, the method and its effect are different: the bypass function can only prevent the elevator car from stopping on the floor L2, on which the elevator car has insufficient space for allowing the passengers waiting on this floor to board, under certain circumstances (e.g. when no passengers are traveling from the floor L1 to the floor L2) and furthermore leads to significantly increased waiting times for the passengers waiting on the floor L2. These disadvantages are eliminated with the method described herein because a stop of the already heavily occupied elevator car on the floor L2 is prevented in any case and the waiting times for the passengers on all floors are already taken into account and minimized in the route planning.

Table 1 furthermore shows a situation (line 4) that may arise in an office building around lunchtime. With respect to a destination call to the floor L1, which is input on the floor L3 in a time window between 11:30 and 12:30, it is assumed that seven additional passengers 4 would like to be transported from the floor L3 to the floor L1 in addition to the calling passenger 4. In this case, the elevator car 10 with a capacity of eight passengers is fully occupied. The destination call control 8 schedules no additional stops for this transport.

The call situations indicated in table 1 can be determined from observations of the behavior of the passengers 4 within a defined time period. The defined time period may amount, for example, to one or two months (or longer), wherein the observations are carried out, e.g., with intervals of one week (i.e. 7 days of observations followed by a break of 7 days). For example, the observations may be recorded by one or more persons, who document the passenger behavior on each floor L1, L2, L3 in dependence on the time of day and the day of the week.

The observations can potentially be supplemented by questioning the passengers 4. These observations make it possible to define the time windows and to determine the number of additional passengers 4 (e.g. by means of averaging). Such observations may be documented for all floors L1, L2, L3 or only for selected floors L1, L2, L3. In this way, time-dependent behavior patterns with respect to the elevator utilization can be determined for each floor L1, L2, L3. The elevator system 1 can be correspondingly configured once the complete table 1 has been generated. A person skilled in the art is aware of the fact that the table 1 can be updated if the utilization of the building 2 and therefore the behavior pattern change, e.g. when a previously unused floor L1, L2, L3 is used by a firm with a large number of employees.

In another exemplary embodiment, the passenger behavior can be determined with the aid of a sensor system. In FIG. 1, the sensor system is represented by sensors 6, wherein one sensor 6 is arranged on each floor L1, L2, L3 and connected to a line 22. The sensor system may supplement or replace the aforementioned observations by persons (and be realized in the form of a self-learning system). In an exemplary embodiment, the sensor system may comprise a counter that determines the number of passengers 4 boarding the elevator car 10 on a floor L1, L2, L3. The counter may comprise a camera (e.g. for recording images in the visible optical spectrum or in the infrared range) in connection with an image processing device, which determines the number of passengers 4 from the recorded images. In another embodiment, the counter may utilize a load measuring device of the elevator car 10 in order to determine the number of passengers 4 boarding on the respective floor L1, L2, L3.

In addition to this information made available by the counter, the sensor system may also utilize information on the destination call or destination calls being input on the respective floor L1, L2, L3. In this case, the sensor system is communicatively linked to the destination call control 8. In another embodiment, the destination call control 8 may in this case utilize the information acquired by the sensor system in order to additionally improve the service schedule, e.g. by increasing or decreasing the additional space requirement of actually waiting passengers or passengers being transported in an elevator. For example, the elevator control according to table 1 initially makes the assumption that five additional passengers 4 are expected for a (first) destination call to the floor L3, which is input on the floor L1 between 7:00 and 7:30, i.e. that a total of six passengers 4 are expected; however, if the sensor system determines that only a total of two passengers 4 have actually boarded the elevator car, the destination call control can reduce the additional space requirement from five additional passengers to one additional passenger and evaluate the situation anew, e.g. schedule an intermediate stop on the floor L2 because sufficient space for the passengers boarding on this floor is now available.

Alternatively, no connection to the destination call control 8 is provided, but the information acquired separately by the sensor system and the destination call control 8 can be subsequently combined and analyzed, e.g. in a computer system used for this purpose. Analogous to the observations by persons, the passenger behavior per floor L1, L2, L3 during a defined time period can be determined by means of the sensor system; the complete table 1 can thereby be generated. In addition, table 1 can be updated by the sensor system, for example, when necessary or in accordance with a defined schedule.

Figure 3:
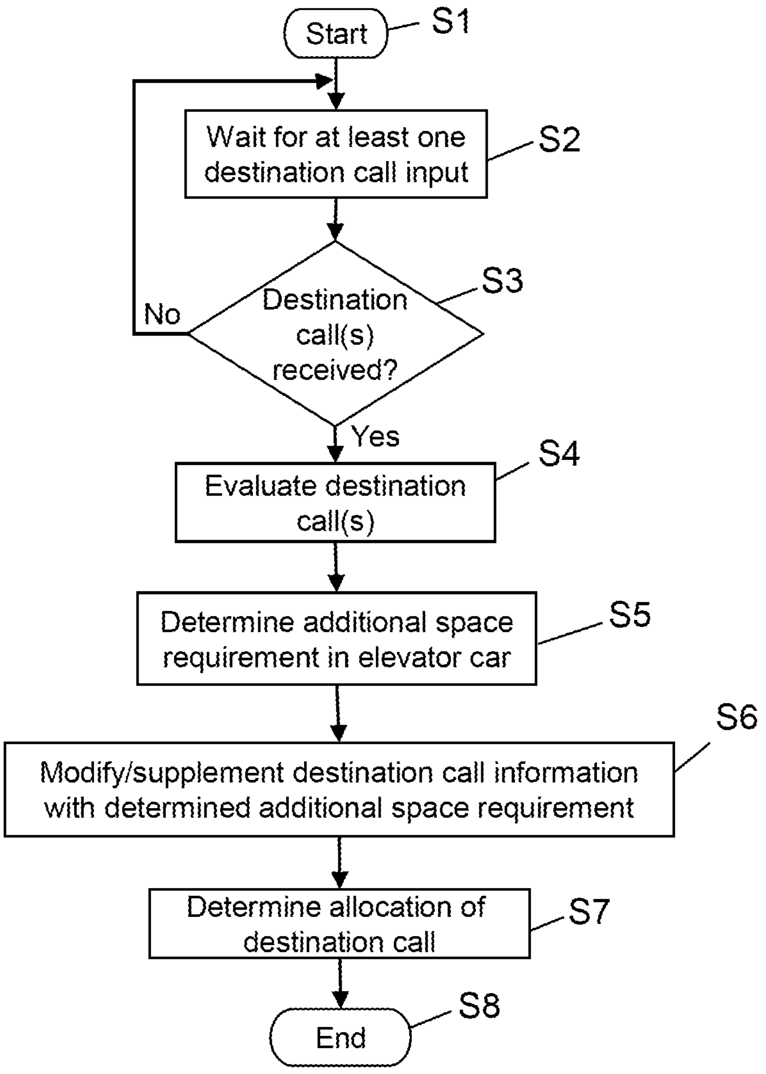
FIG. 3 shows an exemplary representation of an exemplary embodiment of a method for allocating a destination call based on a schematic flow chart.

An exemplary embodiment of a method for operating the elevator system 1, particularly a method for allocating a destination call, is described below with reference to FIG. 3 with the understanding of the basic structure of the elevator system 1 described with reference to FIG. 1 and FIG. 2 and the exemplary call situations illustrated in table 1. FIG. 3 shows an exemplary flowchart of a method for allocating a destination call to an elevator car 10 of the elevator system 1. The method according to FIG. 3 begins in step S1 and ends in step S8.

The method initially waits for the reception of a destination call (steps S2 and S3). When a passenger 4 inputs a destination call at a floor terminal 5, this destination call is received by the destination call evaluation unit 26 of the destination call control 8. A person skilled in the art is aware of the fact that the destination call evaluation unit 26 may receive multiple destination calls simultaneously or within a short time period depending on the traffic volume.

In step S4, the received destination call is evaluated in order to determine call information. In the case of multiple destination calls, each of these destination calls is evaluated. Exemplary criteria, according to which the evaluation is carried out, are the call input floor, the destination floor, the point in time of the destination call or combinations thereof. The point in time of the destination call is acquired, for example, in the form of the time of day and the calendar date. For example, the call information comprises the call input floor and/or the destination floor.

In step S5, an additional space requirement in the elevator car 10 is determined based on the call information. This determination of the additional space requirement utilizes the data stored in the database 28, which in an exemplary embodiment is organized in accordance with table 1. In an exemplary embodiment, the processor 30 checks if the received destination call (or its criteria) corresponds to one of the call situations documented in table 1. If this is the case, the additional space requirement results from the number of additional passengers 4 indicated in table 1 for this call situation.

In step S6, the information of the destination call is in an exemplary embodiment modified with the additional space requirement determined in step S5 (variation A). Each destination call implicitly or explicitly results in information on the space requirement in the elevator car 10 for the respective destination call. For example, the "normal" space requirement per destination call is space for one passenger. The information is modified, for example, in such a way that the determined additional space requirement (e.g. +2 passengers) is added to the normal space requirement ((new) space requirement: 1+2=3 passengers). This modified information is forwarded to the subsequent call allocation (step S7).

According to another exemplary embodiment, the information on the destination call is in step S6 supplemented with the additional space requirement determined in step S5 (variation B). In this exemplary embodiment, the information on the normal space requirement of the destination call being input and the determined information on the additional space requirement are kept separate and both forwarded to the call allocation (step S7).

The method determines the allocation of the destination call in step S7. This is achieved in that the method carries out an allocation algorithm; a person skilled in the art is familiar with such allocation algorithms, for example, based on above-cited document EP 0 443 188 B1 or the above-cited the book by G. C. Barney et al. According to variation A, the call allocation is based on the assumption that a destination call, which has an exemplary space requirement of three passengers, has been input, i.e. the space requirement corresponds to the information modified in step S6. This destination call is conventionally allocated by the implemented allocation algorithm; the allocation algorithm does not have to be expanded or otherwise altered in comparison with known methods because the modification of the space requirement is already carried out in preceding step S6 and therefore takes place independently of the allocation algorithm.

Variation B differs from the call allocation according to variation A in that the call allocation is not simply based on the space requirement in the elevator car 10, which results from adding the normal space requirement and the additional space requirement. This difference is relevant, for example, when a destination call of a passenger 4 is to be allocated on a floor L1, L2, L3, on which one or more other passengers 4 were already allocated to the elevator car 10. According to variation B, the normal space requirement and the additional space requirement of the calling passengers 4 are not simply added in step S7, but rather treated separately. For example, the normal space requirement may be added (e.g. four destination calls result in a normal space requirement for four passengers 4), but the additional space requirement of the passengers may be limited to the maximum additional space requirement of one individual passenger. This has the advantage that more space requirement is included if too few calls are input, but no unnecessary additional space requirement is any longer included at a sufficient number of calls.

In variation B, the allocation algorithm can be respectively supplemented or altered with simpler or more complex rules in order to take into account the additional space requirement in different planning steps. Typical planning steps are the calculation of the space requirement for passengers 4 waiting on a floor L1, L2, L3 or the calculation of the space requirement for passengers, who would like to be jointly and simultaneously transported in the elevator car 10. In both instances, the individual normal space requirement and the individual additional space requirement can be taken into account for each of the respective passengers 4. In the above-described example, the space requirement of all respective passengers was determined by adding the sum of the normal space requirement of the passengers and the maximum additional space requirement of the passengers. Instead of determining the maximum additional space requirement of all passengers, it would in another example also be possible to initially determine the maximum additional space requirement per destination and to add these values across all destinations; this has the advantage that no unnecessary additional space requirement is included for passengers with the same destination if multiple calls are input, but additionally traveling passengers and therefore sufficient space are respectively included for passengers with different destinations.

The following description of other components and functions of the elevator system 1 once again refers to FIG. 1. The floor terminals 5 arranged on the floors L1, L2, L3 are located, e.g., in the vicinity of elevator doors 6 and communicatively linked to the control device 8 via the line 22. In the exemplary embodiment shown, the building 2 has three floors L1, L2, L3 and a floor terminal 5 is provided on each floor. However, the building may also have only two or more than three floors; it is also possible that more than one floor terminal 5 is provided on a floor L1, L2, L3.

The destination call control device 8 is communicatively linked to the elevator control 12 and the floor terminals 5 as described above. In this description, the term communicative link refers to a direct or indirect link that allows a unidirectional or bidirectional communication between two units. Data signals and/or control signals are conventionally transmitted in this case. Such a link may be realized in the form of an electric line system (either in the form of a system of point-to-point connections or a bus system, in which the units connected to the bus system are addressable), a wireless system or a combination of a wireless system and a line system. In FIG. 1, the communicative link is illustrated in the form of exemplary lines 20, 22, wherein the line 20 extends between the communication bus 24 and the elevator car 10 and the line 22 connects the floor terminals to the control device 8. In an exemplary embodiment, the line 22 may be a communication bus system, to which the floor terminals 5 are connected. The line 20 may accordingly also be a communication bus system.

In another exemplary embodiment, at least one floor terminal 5 may be communicatively linked to the destination call control device 8 via a wireless system. In another exemplary embodiment, a mobile electronic device (e.g. mobile telephone, smartphone, smartwatch, tablet PC) may be used for inputting a destination floor instead of a floor terminal 5. The mobile device may also display a notification concerning the elevator allocated to this destination call (e.g. "elevator A"). The mobile electronic device has a wireless module such as a Bluetooth module, an RFID module or an NFC module for the wireless communication with the elevator system 1.

A person skilled in the art is aware of the fact that the destination call control device 8 or its functionality may also be part of the elevator control 12 or a floor terminal 5. In such an instance, for example, the separate illustration of the control device 8 in FIG. 1 could be omitted. The elevator control 12 represents the control device if the destination call control device 8 or its functionality is integrated into the elevator control 12. The implementation of the communicative links therefore also changes depending on the respective design. Consequently, FIG. 1 should be interpreted as a basic representation of an exemplary embodiment of the elevator system 1.

In an exemplary embodiment, a floor terminal 5 is arranged on each floor L1, L2, L3, for example, in the region of the access to an elevator car 10. In an exemplary embodiment, the floor terminal 5 comprises a keypad or a touch-sensitive screen (touchscreen) such that a passenger 4 can input a destination floor (i.e. a destination call). In another exemplary embodiment, the floor terminal 5 comprises a device for detecting an authorization parameter that is assigned to a passenger 4. In an exemplary embodiment, this device is a reader for an information carrier that is carried along by a passenger 4. When the passenger 4 presents the information carrier to the reader, the reader reads information that serves, e.g., for detecting an operating authorization from the information carrier. The passenger 4 can only input a call if the passenger 4 is authorized to operate the input terminal 5. Depending on the respective design, a destination call may also be triggered based on the read information without further action of the passenger 4.

In an exemplary embodiment, the information carrier is realized similar to a card, e.g. in the form of a credit card or an employee identification badge. A memory chip that can be contacted from the outside, an RFID transponder in connection with a memory chip or a code that can be (optically) read from the outside such as alphanumeric symbols, a QR code or a barcode may be located in or the information carrier depending on the respective design. The functionality of the information carrier may alternatively also be realized in a wearable electronic device (e.g. mobile telephone or smartphone). For example, alphanumeric symbols, QR codes, barcodes or color pattern codes can be displayed on the display unit of such devices. Devices of this type also make it possible to establish a wireless link with other electronic devices, e.g. by means of conventional wireless technologies such as Bluetooth, WLAN/Wi-Fi of NFC. The reader of the floor terminal 5 is compatible with the technology of the information carrier used. A person skilled in the art furthermore is aware of the fact that the reader may also be configured for more than one technology.

The invention claimed is:

1. A method for operating an elevator system in a building, wherein the elevator system comprises a destination call control device and an elevator car, which can travel between floors of the building and has a defined passenger capacity, the method comprising:

evaluating a first destination call being input on a floor by a first passenger at a first point in time in order to determine first call information from the first destination call, wherein the first call information contains data on a call input floor or a destination floor;

using the first call information for determining if a number of additional passengers are to be assigned to the first destination call, wherein the number of additional passengers results in an additional space requirement in an elevator car handling the first destination call;

generating information on the additional space requirement if a number of additional passengers are to be assigned to the first destination call; and if a number of additional passengers are to be assigned to the first destination call, allocating the first destination call with the aid of an allocation algorithm by using information on the additional space requirement in order to transport the first passenger from the call input floor to the destination floor, wherein the space requirement of the first passenger is increased by the space requirement of the additional passengers and the resulting overall space requirement is fed to the allocation algorithm in order to allocate the first destination call.

2. The method according to claim 1, in which the determination if a number of additional passengers are to be assigned to the first destination call comprises accessing a database, in which a plurality of datasets can be stored, wherein a dataset has predefined data fields that describe a call situation, and wherein a first data field indicates the call input floor, a second data field indicates a time window, a third data field indicates the destination floor and a fourth data field indicates the number of additional passengers for the call situation described in the dataset, and determining if the first destination call corresponds to a call situation stored in the database.

3. The method according to claim 2, in which the generation of information on the additional space requirement comprises reading the fourth data field in order to determine the number of additional passengers.

4. A method for operating an elevator system in a building, wherein the elevator system comprises a destination call control device and an elevator car, which can travel between floors of the building and has a defined passenger capacity, the method comprising:

evaluating a first destination call being input on a floor by a first passenger at a first point in time in order to determine first call information from the first destination call, wherein the first call information contains data on a call input floor or a destination floor;

using the first call information for determining if a number of additional passengers are to be assigned to the first destination call, wherein the number of additional passengers results in an additional space requirement in an elevator car handling the first destination call;

generating information on the additional space requirement if a number of additional passengers are to be assigned to the first destination call; and if a number of additional passengers are to be assigned to the first destination call, allocating the first destination call with the aid of an allocation algorithm by using information on the additional space requirement in order to transport the first passenger from the call input floor to the destination floor, wherein the information on the additional space requirement is kept separate of the first destination call and both are fed to the allocation algorithm separately in order to allocate the first destination call.

5. The method according to claim 4, in which the allocation of destination calls is, if a number of destination calls essentially are input by different passengers at the first point in time, based on a space requirement that, for one passenger per destination call, results from the number of destination calls and a maximum number of additional passengers, wherein a number of additional passengers is determined for each destination call and the destination call, to which the maximum number of additional passengers is assigned, is determined thereof.

6. The method according to claim 4, in which the allocation of destination calls is, if a number of destination calls essentially are input by different passengers at the first point in time, based on a space requirement that, for one passenger per destination call, results from the number of destination calls and a maximum number of additional passengers, wherein a number of additional passengers is determined for each destination call and each floor and a maximum value of the additional space requirement per floor is determined thereof, and wherein the resulting maximum values are added.

7. An elevator control system for controlling an elevator system including an elevator car, the elevator control system comprising:

a destination call control device that is configured to:

evaluate a first destination call being input on a floor by a first passenger at a first point in time in order to determine first call information from the first destination call, wherein the first call information contains data on a call input floor or a destination floor;

use the first call information for determining if a number of additional passengers are to be assigned to the first destination call, wherein the number of additional passengers results in an additional space requirement in an elevator car handling the first destination call;

generate information on the additional space requirement if a number of additional passengers are to be assigned to the first destination call;

if a number of additional passengers are to be assigned to the first destination call, allocate the first destination call with the aid of an allocation algorithm by using information on the additional space requirement in order to transport the first passenger from the call input floor to the destination floor, and to increase the space requirement of the first passenger by the space requirement of the additional passengers and to feed the resulting overall space requirement to the allocation algorithm in order to allocate the first destination call.

8. The elevator control system according to claim 7, further comprising a storage device, in which a database containing a plurality of datasets is stored, wherein each dataset has predefined data fields that describe a call situation, and wherein a first data field indicates the call input floor, a second data field indicates a time window, a third data field indicates the destination floor and a fourth data field indicates the number of additional passengers for the call situation described in the dataset.

9. The elevator control system according to claim 8, further comprising a sensor system that is linked to the destination call control device and the storage device, wherein the sensor system determines information on a number of passengers, who board the elevator car on a floor.

10. The elevator control system according to claim 9, in which the sensor system comprises sensors that are arranged on the floors and linked to the destination call control device and the storage device via a line.

11. The elevator control system according to claim 10, wherein a sensor of the sensor system comprises a camera and the sensor system is configured for determining the number of passengers based on recorded images of the camera.

12. The elevator control system according to claim 9, in which the destination call control device is further configured to:

adapt the generated information on the additional space requirement by means of the information on the number of boarding passengers determined by the sensor system and to use the adapted information on the additional space requirement for handling the passengers.

13. An elevator control system for controlling an elevator system including an elevator car, the elevator control system comprising:

a destination call control device that is configured to:

evaluate a first destination call being input on a floor by a first passenger at a first point in time in order to determine first call information from the first destination call, wherein the first call information contains data on a call input floor or a destination floor;

use the first call information for determining if a number of additional passengers are to be assigned to the first destination call, wherein the number of additional passengers results in an additional space requirement in an elevator car handling the first destination call;

generate information on the additional space requirement if a number of additional passengers are to be assigned to the first destination call;

if a number of additional passengers are to be assigned to the first destination call, allocate the first destination call with the aid of an allocation algorithm by using information on the additional space requirement in order to transport the first passenger from the call input floor to the destination floor; and to keep the information on the additional space requirement separate of the first destination call and to feed both to the allocation algorithm separately in order to allocate the first destination call.

14. The elevator control system according to claim 13, further comprising a storage device, in which a database containing a plurality of datasets is stored, wherein each dataset has predefined data fields that describe a call situation, and wherein a first data field indicates the call input floor, a second data field indicates a time window, a third data field indicates the destination floor and a fourth data field indicates the number of additional passengers for the call situation described in the dataset.

15. The elevator control system according to claim 14, further comprising a sensor system that is linked to the destination call control device and the storage device, wherein the sensor system determines information on a number of passengers, who board the elevator car on a floor.

16. The elevator control system according to claim 15, in which the sensor system comprises sensors that are arranged on the floors and linked to the destination call control device and the storage device via a line.

17. The elevator control system according to claim 16, wherein a sensor of the sensor system comprises a camera and the sensor system is configured for determining the number of passengers based on recorded images of the camera.

18. The elevator control system according to claim 15, in which the destination call control device is further configured to:

adapt the generated information on the additional space requirement by means of the information on the number of boarding passengers determined by the sensor system and to use the adapted information on the additional space requirement for handling the passengers.

* * * * *